US010691788B2

(12) United States Patent
Frenz (10) Patent No.: US 10,691,788 B2
(45) Date of Patent: Jun. 23, 2020

(54) SYSTEMS AND METHODS FOR PROVISIONING A CAMERA WITH A DYNAMIC QR CODE AND A BLE CONNECTION (71) Applicant: Honeywell International Inc., Morristown, NJ (US)

(72) Inventor: Jonathan Paul Frenz, Minneapolis, MN (US)

(73) Assignee: ADEMCO INC., Golden Valley, MN (US)

( * ) Notice: Subject to any disclaimer, the term of this patent is extended or adjusted under 35 U.S.C. 154(b) by 318 days.

(21) Appl. No.: 15/886,546

(22) Filed: Feb. 1, 2018

(65) Prior Publication Data
US 2018/0225444 A1 Aug. 9, 2018

Related U.S. Application Data (60) Provisional application No. 62/454,360, filed on Feb. 3, 2017.

(51) Int. Cl.
G06F 21/44 (2013.01)
H04W 12/04 (2009.01)
(Continued)

(52) U.S. Cl.
CPC ............ *G06F 21/445* (2013.01); *G06F 21/44* (2013.01); *G06K 7/1417* (2013.01); *G09C 5/00* (2013.01);
(Continued)

(58) Field of Classification Search
CPC .. G06K 7/1417; G06K 7/1434; G06K 7/1404; G06K 7/1443; G06K 19/06037;
(Continued)

(56) References Cited

U.S. PATENT DOCUMENTS 8,879,994 B2   11/2014  Brown et al.
9,009,805 B1   4/2015   Kirkby et al.
(Continued)

FOREIGN PATENT DOCUMENTS

GB   2523430 A      8/2015
GB   2524987 A      10/2015
KR   1020170006623 A   1/2017

OTHER PUBLICATIONS

McCune, J.M. et. al. (2005). Seeing-Is_Believing: Using Camera Phones for Human-Verifiable Authentication. Proceedings of the 2005 IEEE Symposium on Security and Privacy (Year: 2005).*
Borisov, A Novel Approach for User Authentication to Industrial Components Using QR Codes, 2015 IEEE 39th Annual International Computers, Software & Applications Conference, vol. 3, pp. 61-66, Jul. 1, 2015.
Extended European search report from corresponding EP patent application 19183651.9, dated Oct. 11, 2019.
(Continued)

*Primary Examiner* — Brian F Shaw
(74) *Attorney, Agent, or Firm* — Husch Blackwell LLP (57) ABSTRACT Some methods can include a user device establishing a Bluetooth connection with a camera, the user device receiving a camera PIN from the camera via the Bluetooth connection, the user device generating and displaying a QR code including the camera PIN and a device PIN, the user device receiving a message from the camera via the Bluetooth connection, and the user device confirming that the message includes the device PIN. Some methods can include the camera establishing the Bluetooth connection with the user device, the camera transmitting the camera PIN to the user device via the Bluetooth connection, the camera capturing an image of the QR code including the camera PIN and the device PIN displayed on the user interface, the camera confirming that the QR code includes the camera PIN, and the camera transmitting a message including the device PIN to the user device via the Bluetooth connection.

20 Claims, 6 Drawing Sheets (51) Int. Cl.
  *H04W 12/06* (2009.01)
  *G09C 5/00* (2006.01)
  *H04L 9/08* (2006.01)
  *H04L 9/32* (2006.01)
  *H04L 29/06* (2006.01)
  *H04W 76/14* (2018.01)
  *G06K 7/14* (2006.01)
  *H04W 4/80* (2018.01)
  *H04W 12/08* (2009.01)

(52) U.S. Cl.
  CPC .......... *H04L 9/0822* (2013.01); *H04L 9/0841* (2013.01); *H04L 9/3226* (2013.01); *H04L 63/0838* (2013.01); *H04L 63/0876* (2013.01); *H04L 63/18* (2013.01); *H04W 12/04* (2013.01); *H04W 12/06* (2013.01); *H04W 76/14* (2018.02); *H04M 2250/02* (2013.01); *H04W 4/80* (2018.02); *H04W 12/08* (2013.01)

(58) Field of Classification Search
  CPC ..... H04W 4/80; H04W 12/06; H04W 12/002; H04W 12/0023; H04W 12/003; H04W 12/08; H04W 12/04; G06Q 20/3276; G06Q 20/3274; G06F 21/44; G06F 16/9554; H04M 2250/02; H04M 2250/52; H04N 21/4223; H04L 63/0876; H04L 63/18; H04L 9/0822; H04L 9/0841; H04L 9/3226; G09C 5/00
  See application file for complete search history.

(56) References Cited

U.S. PATENT DOCUMENTS

| 9,088,306 | B1 | 7/2015 | Ramachandran et al. | |
| 2014/0229735 | A1 | 8/2014 | Holleis | |
| 2014/0370807 | A1* | 12/2014 | Lei | H04W 4/21 455/41.2 |
| 2016/0062572 | A1 | 3/2016 | Yang et al. | |
| 2017/0250974 | A1* | 8/2017 | Antonyraj | H04W 12/04 |

OTHER PUBLICATIONS

Extended European search report from corresponding EP patent application 18154989.0, dated Mar. 21, 2018.

Marktscheffel et al., QR Code Based Mutual Authentication Protocol for Internet of Things, 2016 IEEE 17th International Symposium on a World of Wireless, Mobile and Multimedia Networks (WOWMOM), pp. 1-6, dated Jun. 21, 2016.

Communication under Rule 71(3) EPC and EPO Form 2056 for corresponding EP patent application 18 154 989.0, dated Feb. 11, 2019.

Jonathan M. Mccune et al., Seeing-Is-Believing: using camera phones for human-verifiable authentication, Int. J. Security and Networks, vol. 4, No. 1/2, pp. 43-56, 2009; cited as XP055676841 in Communication under Rule 71 (3) EPC dated Mar. 31, 2020.

Communication under Rule 71(3) EPC from corresponding EP patent application 19183651.9, dated Mar. 31, 2020.

* cited by examiner

SYSTEMS AND METHODS FOR PROVISIONING A CAMERA WITH A DYNAMIC QR CODE AND A BLE CONNECTION

CROSS-REFERENCE TO RELATED APPLICATIONS

This application claims priority to U.S. Provisional Patent Application No. 62/454,360 filed Feb. 3, 2017 and titled "Systems and Methods for Provisioning a Camera With a Dynamic QR Code and BLE." U.S. Application No. 62/454,360 is hereby incorporated by reference.

FIELD

The present invention relates generally to provisioning cameras. More particularly, the present invention relates to systems and methods for provisioning a camera with a dynamic QR code and a Bluetooth low energy (BLE) connection.

BACKGROUND

A provisioning process includes bringing an IoT device online and establishing a secure connection with a cloud server by, for example, transmitting a home's WiFi credentials to the device and registering the device as belonging to an installing user. Provisioning processes are known in the art, but known provisioning processes have usability weaknesses and may be vulnerable to attackers.

For example, when a known provisioning process uses WiFi or BLE with no QR code or other layer of authentication to provision the device, the device is vulnerable to an attacker registering the device who may not even be physically present in the same room as the device, but who can connect to the device first. Similarly, when a known provisioning process uses WiFi or BLE with no QR code or other layer of authentication to provision the device, a phone of the installing user is vulnerable to being tricked into connecting to an attacker's fake device and sending WiFi credentials to the attacker's fake device.

Some known provisioning processes use WiFi with a static QR code printed on the device to provision the device. However, when these processes are used, the device may be vulnerable to both the attacker who physically accesses the device before the installing user and, thus, knows the static QR code and the attacker who tricks the phone of the installing user to connect to the fake device.

Still other known provisioning processes use WiFi with a dynamic QR code to provision the device. However, when these processes are used, the user experience can be poor because a mobile application being executed on the phone of the installing user cannot provide any feedback to the installing user about the failure or success of the provisioning process during a WiFi connection process.

Furthermore, when a provisioning process uses WiFi instead of BLE to provision the device, the user experience can be poor because, when the phone of the installing user is connected to an access point of the device, the phone does not have an Internet connection during the provisioning process.

When the device is a camera, provisioning the camera securely is especially important because the camera can transmit live video of a consumer's home. Therefore, there is a continuing, ongoing need for improved systems and methods.

DETAILED DESCRIPTION

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for provisioning a camera with a dynamic QR code and a BLE connection. For example, the dynamic QR code can be displayed on a screen of a user's phone and presented to the camera, which can capture an image of the dynamic QR code displayed. Indeed, such systems and methods address the usability and security issues discussed above by providing mutual authentication that is robust against attackers and prevents eavesdropping attacks, MitM attacks, and other attacks known in the art.

In accordance with disclosed embodiments, systems and methods disclosed herein can use a combination of the BLE connection and the dynamic QR code to provision the camera. For example, the user's phone can transmit the BLE signal to the camera to connect the phone to the camera. Then, a mobile application being executed on the phone can cause the dynamic QR code to be displayed on the screen of the phone, and the user can hold the screen of the phone in front of a lens of the camera so that the camera can capture the image of the dynamic QR code displayed on the screen of the phone. As disclosed and described herein, this provisioning process can authenticate the camera and the phone to each other and ensure that the camera connected via the BLE signal is the same one the user is provisioning and that the phone connected via the BLE signal is the same one that is displaying the dynamic QR code.

In some embodiments, the provisioning process disclosed and described herein can include the following steps to mutually authenticate the user's phone and the camera. First, the user's phone can connect with the camera via the BLE signal. Then, the user's phone can verify a device certificate of the camera. Next, the phone and the camera can execute an Elliptic-curve Diffie-Hellman (ECDH) operation via the BLE connection with an ephemeral camera key establishing a secure BLE tunnel with a symmetric encryption key. Then, the camera can transmit a randomly generated camera PIN to the phone via the secure BLE tunnel. Next, the phone can randomly generate a phone PIN, the phone can encrypt the phone PIN and the randomly generated camera PIN using the symmetric encryption key, and the phone can generate a QR code containing the encrypted data. Then, the camera can read the QR code and decrypt the contents thereof to ensure that the randomly generated camera PIN in the QR code is the same randomly generated camera PIN that that camera transmitted to the phone. Finally, the camera can transmit the phone PIN to the phone via the secure BLE tunnel, and the phone can ensure that the phone PIN received from the camera is the same phone PIN that the phone presented in the QR code.

Additionally or alternatively, in some embodiments, the provisioning process disclosed and described herein can include the following steps. First, the user can log into the mobile application being executed on the user's phone, and the mobile application can discover and connect to the camera via a Bluetooth connection. For example, the user plugging in the camera can trigger the camera transmitting an undirected Bluetooth connection advertisement message, and the camera can cease transmitting the undirected Bluetooth connection advertisement upon connecting with the mobile application. Then, the camera and the mobile application can establish a session key for sharing provisioning data, and the camera and the phone can authenticate each other with the QR code. Next, the camera can connect to a WiFi network based on WiFi credentials shared from the mobile application. For example, after the mobile application shares provisioning parameters with the camera, the mobile application can provide a WiFi access point and a password to the camera to connect to the WiFi access point. In some embodiments, if the mobile application does not write the provisioning parameters to the camera, then the mobile application will not accept the WiFi credentials and will not connect to the WiFi network. In some embodiments, a SSID of the WiFi access point can be selected via manual entry of the SSID and the password or via the camera scanning an SSID list. Then, the camera can connect to a cloud server and begin reporting based on the WiFi credentials shared from the mobile application. For example, the mobile application can write into provisioning services of the camera and issue application commands to start connecting to the cloud server. After successful connection to the cloud server, the camera can start a normal operation process.

In some embodiments, when more than a 20-byte APDU is being transferred in a reading/writing request, a fragmentation/defragmentation approach can be followed such that the BLE signal as disclosed and described herein can include a packet that includes a header with a 1-bit "more bit" number and a 7-bit sequence number. The more bit number can indicate whether there are more read/write packets to complete the APDU in the reading/writing request such that 0 can mean there are no more messages, and 1 can mean there are more messages to be read to assemble the APDU. The sequence number can include the sequence number of the APDU as fragmented, and the header can be followed by a 20 byte payload that includes the APDU as fragmented. In some embodiments, the BLE signal can include the header even when there is only one fragment to be transmitted.

In some embodiments, a minimum encrypted packet count can be two. Therefore, each BLE signal will require two BLE packets to be sent: a first packet, followed by a time delay, followed by a second packet.

In some embodiments, the camera and the phone can use an ECDH key establishment protocol to establish a shared secret via the BLE signal. The phone can share its public key with the camera, and each of the phone and the camera can generate random numbers to share with each other. The camera can provide its public certificate to the phone, which can verify a signature of the camera. In some embodiments, both the phone and the camera can create the shared secret from a public/private key pair and per elliptic curve cryptography. From the shared secret, a key derivation function can use the random numbers generated to generate a session for encryption.

In some embodiments, systems and methods disclosed herein can use an AES-128 encryption scheme with CBC and PKCS #7 padding such that the first 16 bytes of any encrypted payload can be the IV for decryption of the rest of a fragmented payload. The IV can be securely and randomly generated on demand by an originator of the payload, and once a recipient receives the entire payload and assembles fragments thereof, the first 16 bytes can be used as the IV for AES decryption of the remaining bytes. In accordance with the above, the minimum packet count can be two. Furthermore, after the session is created as described above, all writes can be ignored, but all reads of encrypted fields other than the phone PIN and a QR verification state can return the encrypted ASCII string "null" until the QR code is verified. However, after the camera verifies the QR code, all encrypted fields can be accessible.

As explained above, after the session is started, each of the camera and the mobile application can generate a PIN. The mobile application can read the randomly generated camera PIN and create the QR code containing both the phone PIN and the randomly generated camera PIN. In some embodiments, the contents of the QR code can be encrypted using the same encryption method as disclosed and described in connection with BLE encrypted packets such that an encrypted body of the QR code can include the randomly generated camera PIN and the phone PIN with an ASCII space character therebetween. In some embodiments, the camera can read and decrypt the QR code the same way that the camera can decrypt a defragmented BLE message as disclosed and described herein. If the randomly generated camera PIN read from the QR code matches the randomly generated camera PIN generated by the camera, then the camera can consider the phone authenticated and allow the phone to request and send the WiFi credentials. In some embodiments, the camera can transmit its QR verification state to the phone to notify the phone of the camera's status. In some embodiments, the camera can return the phone PIN in an appropriate BLE field only after the camera verifies the QR code, and thereafter, the phone can compare the phone PIN received from the camera with the phone PIN generated by the phone for verification to ensure connection to the correct camera.

In some embodiments, after the WiFi credentials are written to the camera, the camera can attempt to connect to the WiFi network and notify the phone of a result of such an attempt. When the connection succeeds, the camera can transmit its new WiFi connection state to the phone and transmit an activation provisioning call to the cloud server. When the provisioning call fails, the camera can disassociate from the WiFi network and notify the phone of its new WiFi connection state. However, when the provisioning call succeeds, the camera can connect to the cloud server and turn off its BLE connection with the phone.

In some embodiments, the camera as disclosed and described herein can include one or more of an LED and an audio notification device. In some embodiments, the LED can flash and/or the audio notification device can emit audible notifications in different combinations to present visual and/or audio notifications when a BLE radio of the camera is on, when the BLE radio of the camera is off, when the phone is connected to the camera, when the QR code has been read, when the WiFi credentials are written to the camera and the camera attempts to connect to the WiFi network, when the camera is attempting to provision, when provisioning is successful or fails, when the phone disconnects from the camera, when the camera is disconnected from all phones, when the camera is provisioned, or when the camera is offline and disconnected.

Figure 1:
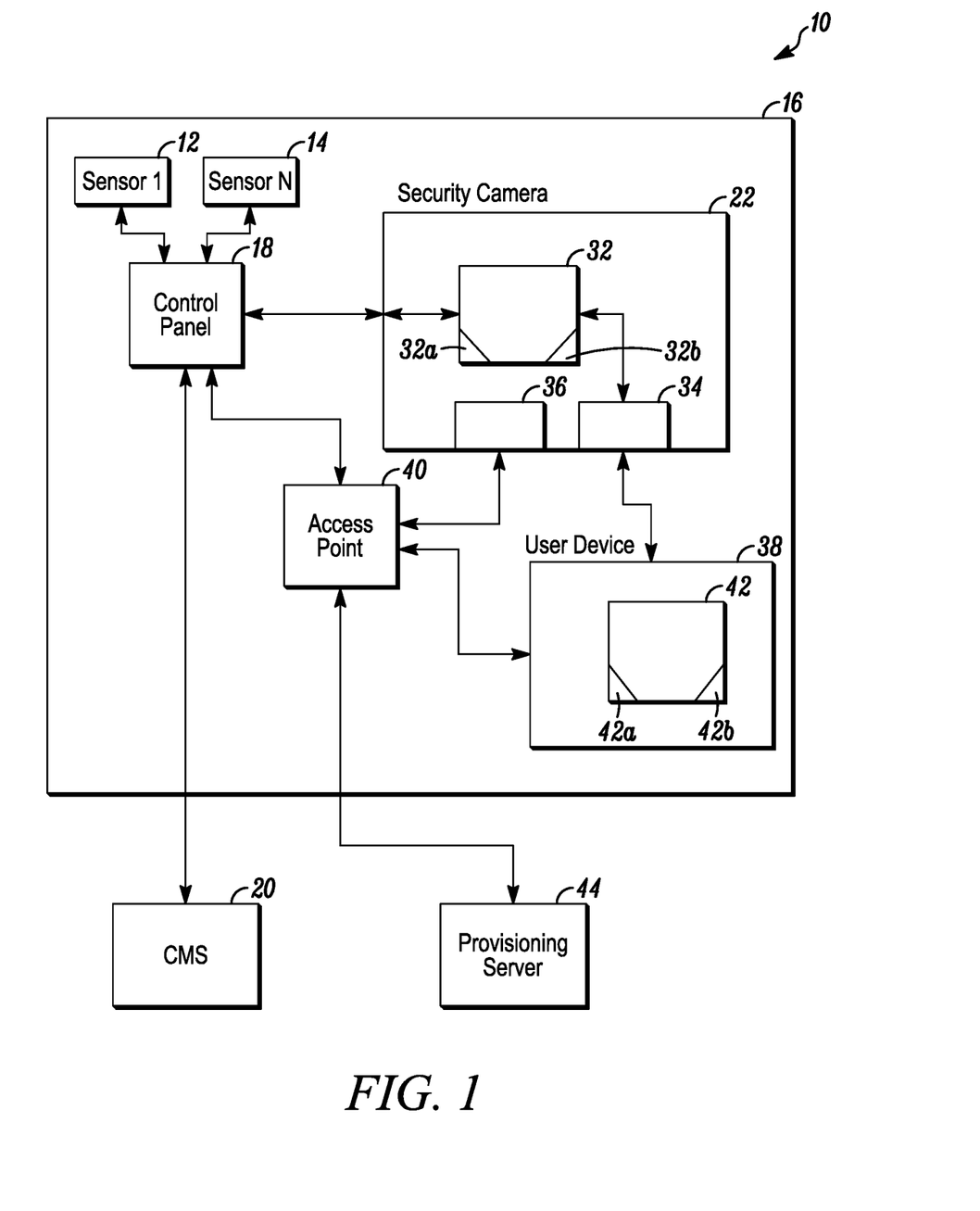
FIG. 1 is a block diagram of a security system in accordance with disclosed embodiments.

FIG. 1 is a block diagram of a security system 10 in accordance with disclosed embodiments. As seen in FIG. 1, the security system 10 can include one or more security sensors 12, 14, 22 that monitor a secured area 16 for threats, and in some embodiments, the security sensors 12, 14, 22 can include contact, intrusion, camera, motion, fire, smoke, and/or gas detectors. The security sensors 12, 14, 22 can communicate with a control panel 18, and the control panel 18 can monitor for activation of one or more of the security sensors 12, 14, 22.

In some embodiments, the control panel 18 can send an alarm message to a central monitoring station 20 upon the activation of one of the security sensors 12, 14, 22, and the central monitoring station 20 may respond by summoning appropriate help. For example, if the one of the security sensors 12, 14, 22 detects a fire, then the central monitoring station 20 may summon a local fire department. Alternatively, if the one of the security sensors 12, 14, 22 detects an intrusion, then the central monitoring station 20 may summon the police.

In some embodiments, one of the security sensors 12, 14, 22 can include a security camera 22 that can capture video and/or detect motion. In some embodiments, the security camera 22 can include an Internet Protocol (IP) security camera that captures the video and streams the video captured over the Internet to either an authorized user or the central monitoring station 20.

In any embodiment, the security camera 22 can include control circuitry 32, which can include one or more programmable processors 32a and executable control software 32b as would be understood by one of ordinary skill in the art. The executable control software 32b can be stored on a transitory or non-transitory computer readable medium, including, but not limited to local computer memory, RAM, optical storage media, magnetic storage media, and the like. In some embodiments, the control circuitry 32, the programmable processor(s) 32a, and the executable control software 32b of the security camera 22 can execute and control some of the methods disclosed herein.

In some embodiments, the security camera 22 can include a Bluetooth transceiver 34 and a WiFi transceiver 36, and the Bluetooth transceiver 34 can communicate with a Bluetooth enabled device, such as a user device 38. In some embodiments, the user device 38 can include a smart phone, but the user device 38 can additionally or alternatively include a tablet, a laptop, or any other Bluetooth-enabled device as would be understood by one of ordinary skill in the art. The WiFi transceiver 36 can communicate with an access point 40, such as an Internet router, over a WiFi network (e.g. IEEE 802.11 protocol), and the access point 40 can broadcast a wireless network and connect with devices having authenticated wireless credentials, such as the user device 38, the control panel 18, and the security camera 22. In some embodiments, the security camera 22 can access a provisioning server 44 (a cloud server) via the access point 40 during a provisioning process (see FIG. 2).

In any embodiment, the user device 38 can include control circuitry 42, which can include one or more programmable processors 42a and executable control software 42b as would be understood by one of ordinary skill in the art. In some embodiments, the control circuitry 42, the programmable processor(s) 42a, and the executable control software 42b of the user device 38 can execute and control some of the methods disclosed herein. In some embodiments, the executable control software 42b of the user device 38 can include a mobile application ("app") specifically designed to assist in provisioning the security camera 22. Furthermore, although not illustrated, the user device 38 can also include a Bluetooth transceiver and a WiFi transceiver, similar to the Bluetooth transceiver 34 and the WiFi transceiver 36 of the security camera 22.

Figure 2:
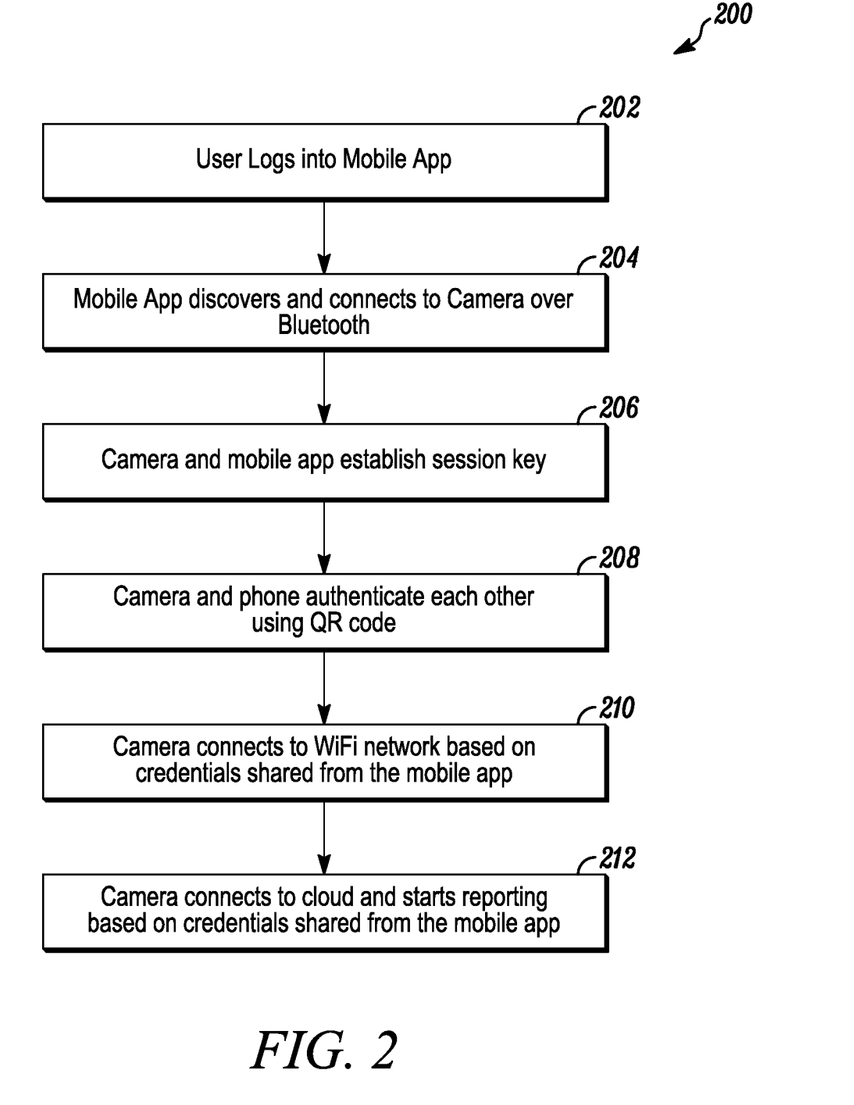
FIG. 2 is a flow diagram of a provisioning process in accordance with disclosed embodiments.

FIG. 2 is a flow diagram of a method 200 for provisioning a security camera (e.g. the security camera 22) in accordance with disclosed embodiments. As seen in FIG. 2, the method 200 can include a user interacting with a user device (e.g. the user device 38) to log into a mobile application (e.g. the executable control software 42b) as in 202. In some embodiments, the user logging in to the mobile application can include the mobile application sending user credentials to a cloud server and receiving a response from the cloud server that either authenticates or denies the user based on authenticity of the user credentials.

Furthermore, the method 200 can include the mobile application and the user device discovering and finding a camera (e.g. the security camera 22) to provision via a Bluetooth connection as in 204, the camera and the mobile application establishing a session key as in 206, and the camera and the mobile application authenticating each other using a QR code as in 208. For example, in some embodiments, the mobile application can generate the QR code, the user can point a screen of the user device at a lens of the camera, and the camera can capture an image of the QR code. Furthermore, in some embodiments, the QR code generated by the user device can be dynamic in that the QR code can contain data provided by the camera and data identifying the user device (see FIG. 3). Further still, in some embodiments, the data included within the QR code can be encrypted, and the encrypted data can be decrypted using a symmetric encryption key established using an ECDH operation (see FIG. 7).

Further still, the method 200 can include the camera connecting to a WiFi network after receiving WiFi credentials from the mobile application as in 210. In some embodiments, the camera can scan for nearby WiFi networks and request the WiFi credentials from the mobile application for a strongest WiFi network detected. Additionally or alternatively, in some embodiments, the user can select the WiFi network to which the camera should connect via the mobile application and provide the WiFi credentials to the camera via the mobile application. Additionally or alternatively, the mobile application can automatically provide the WiFi credentials for the wireless network to which the user device is connected.

Finally, the method 200 can include the camera connecting to the cloud server via the wireless network as in 212. For example, in some embodiments, the camera can report to the cloud server and register with the cloud server. In some embodiments, the mobile application can provide a URL for the cloud server and transmit the URL for the cloud server to the camera. In some embodiments, the URL can be included in the QR code, and in some embodiments, the URL can be transmitted to the camera via Bluetooth. In some embodiments, the mobile application can provide the user credentials to the camera, such as the user credentials entered to log in to the mobile application as in 202, so that the cloud server can register the camera with an identified user account. In some embodiments, the camera can establish a heartbeat service with the cloud server and transmit MAC ID information, country codes data, or any other data necessary to register the camera. After registering with the cloud server, the camera can capture images or video, stream the images or the video over the Internet, and detect threats.

Figure 3:
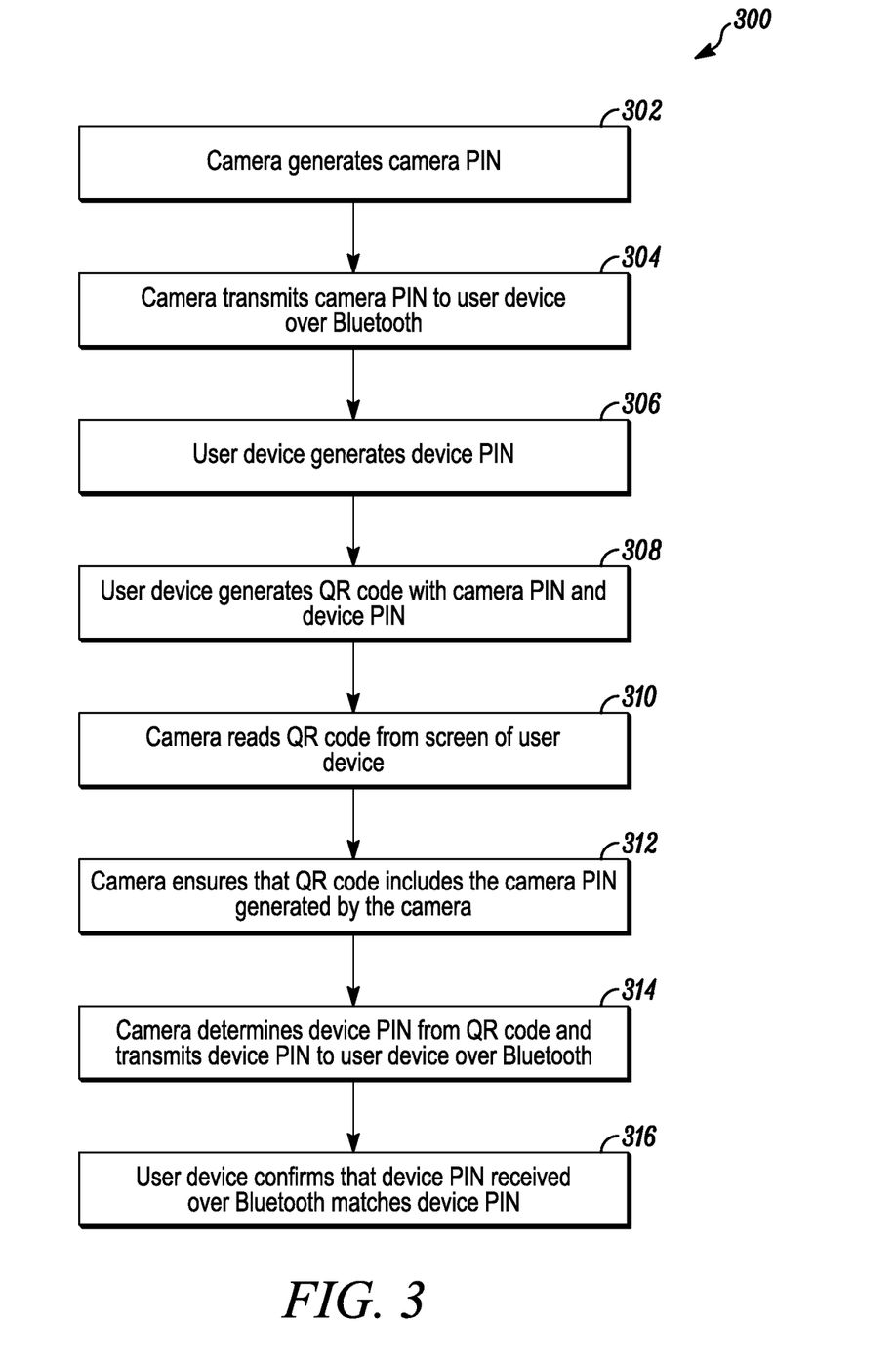
FIG. 3 is a flow diagram of a security service process in accordance with disclosed embodiments.

FIG. 3 is a flow diagram of a method 300 for mutual authentication between a camera and a user device via a Bluetooth connection using a QR code in accordance with disclosed embodiments. As seen in FIG. 3, the method 300 can include the camera randomly generating a camera PIN as in 302, the camera transmitting the camera PIN to the user device and a mobile application executing on the user device via a Bluetooth connection as in 304, the mobile application randomly generating a device PIN as in 306, and the mobile application generating and displaying, on a screen of the user device, the QR code including the camera PIN and the device PIN as in 308. In some embodiments, data included in the QR code can be encrypted. Furthermore, the method 300 can include the camera decoding the QR code after capturing an image of the QR code as in 310, and the camera confirming that the QR code includes the camera PIN that the camera transmitted via the Bluetooth connection as in 312. Further still, the method 300 can include the camera transmitting the device PIN decoded from the QR code to the user device via the Bluetooth connection as in 314, and the user device confirming that the device PIN received from the camera matches the device PIN generated as in 316. When the device PIN received from the camera matches the device PIN generated, the user device can ensure that the camera that read the QR code is the camera connected to the user device.

Figure 4:
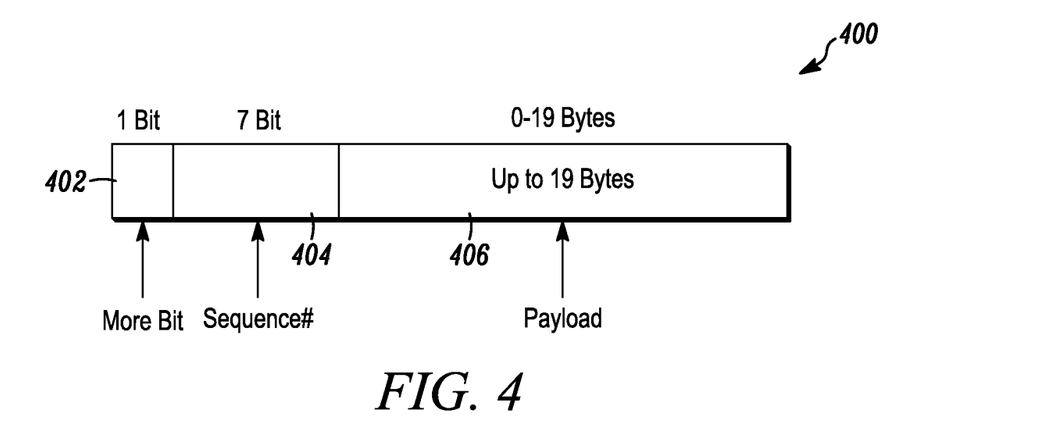
FIG. 4 is a block diagram of a BLE packet in accordance with disclosed embodiments.

Communication via Bluetooth as disclosed herein may include transmitting one or more BLE packets via a Bluetooth connection. In this regard, FIG. 4 is a block diagram of a BLE packet 400 in accordance with disclosed embodiments. As seen in FIG. 4, the BLE packet 400 can include a header and a payload 406, wherein the header can include a more bit 402 and a sequence number 404. For example, the more bit 402 can include 1 bit and can indicate whether there are any more packets to be received after the packet 400 to complete a message. The sequence number 404 can include, for example, 7 bits and can indicate a packet number in the message. For example, if the packet 400 is the first packet of the message, then the sequence number 404 may equal 1. In some embodiments, the payload 406 can include, for example, 20 bits and can include a portion or a fragment of the message.

Figure 5:
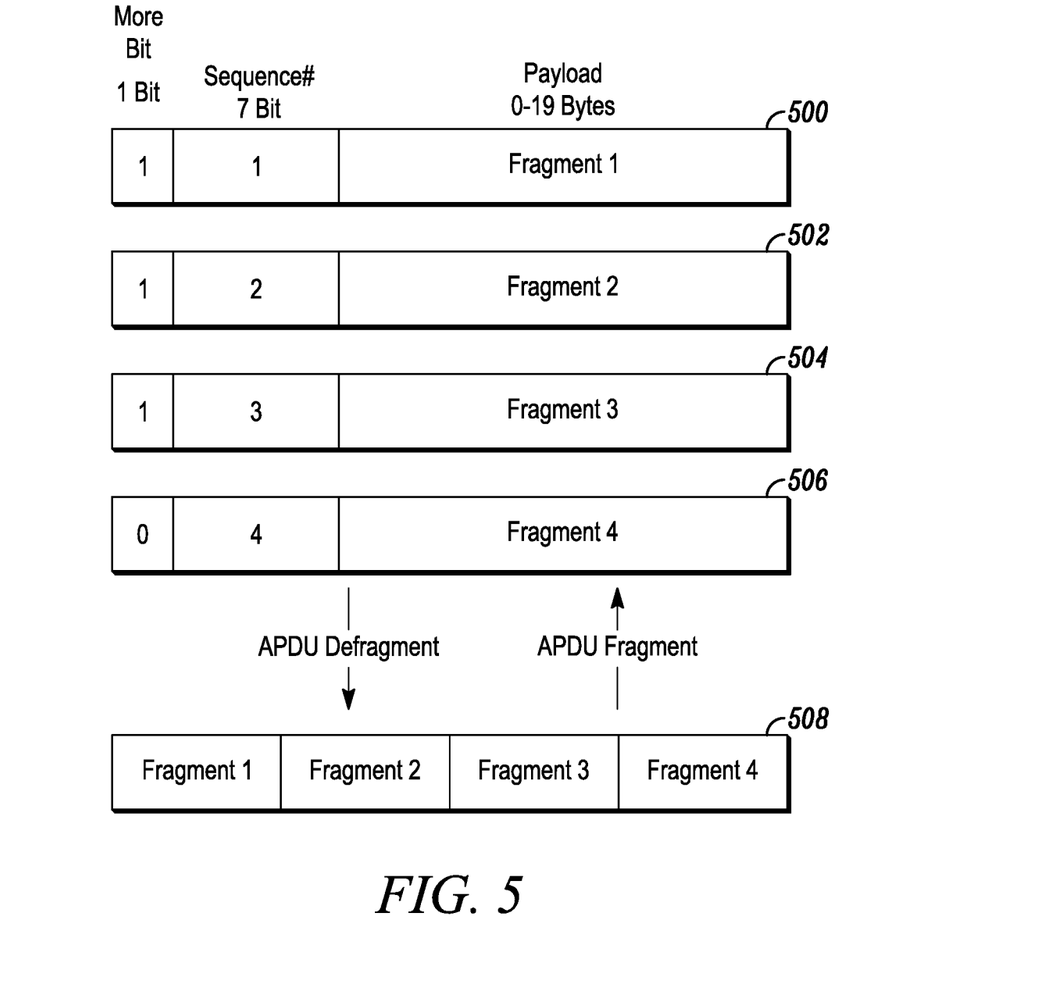
FIG. 5 is a block diagram of a plurality of packets for transmitting a message via a BLE connection in accordance with disclosed embodiments.

FIG. 5 is a block diagram of a plurality of packets 500-506 for transmitting a message 508 via Bluetooth in accordance with disclosed embodiments. Each of the plurality of packets 500-506 can have a format similar to the packet 400 of FIG. 4. For example, as seen in FIG. 5, each of the plurality of packets 500-504 can each include a respective more bit with a value of 1, thereby indicating that another one of the plurality of packets 500-506 will follow to complete the message 508. However, a last of the plurality of packets 506 can include a more bit with a value of 0, thereby indicating that no more packets will follow to complete the message 508. Furthermore, each of the plurality of packets 500-506 include a respective sequence number 1-4 to indicate an order of a respective one of the plurality of packets 500-506 in the message 508. Accordingly, a processor (see FIG. 6) can combine a respective payload of each of the plurality of packets 500-506 to generate the message 508. That is, the message 508 can include each of the fragments stored in the respective payload of each of the plurality of packets 500-506.

Figure 6:
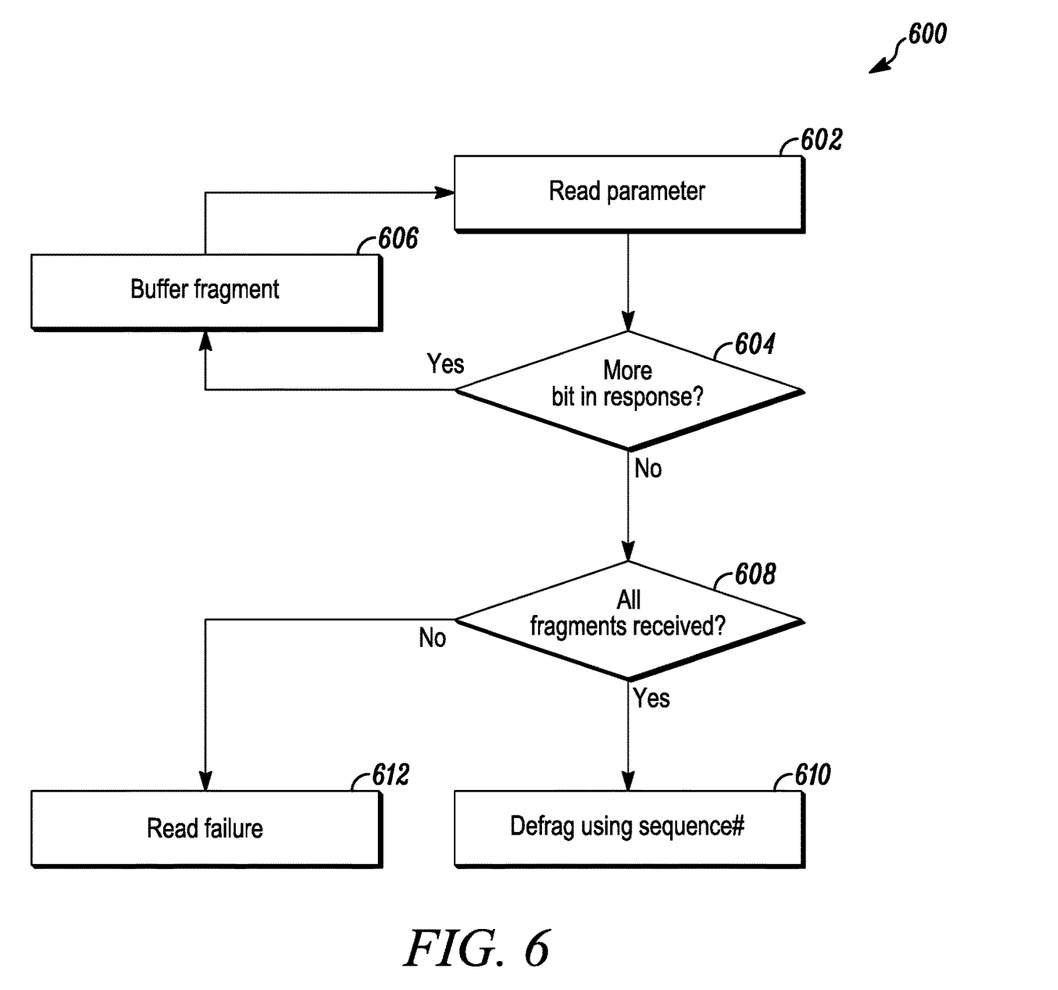
FIG. 6 is a flow diagram of a fragmentation and defragmentation process in accordance with disclosed embodiments.

FIG. 6 is a flow diagram of a fragmentation and defragmentation method 600 in accordance with disclosed embodiments that can be executed by a processor to generate the message 508 of FIG. 5. As seen, the method 600 can include receiving a packet, such as one of the plurality of packets 500-506, and extracting data in a payload of the packet as in 602. Next, the method 600 can include determining whether a header of the packet has a value indicating that more packets are to be received (e.g. does more bit=0?) as in 604. If the header indicates more packets are coming (e.g. header=1), then the method 600 can include buffering the payload as in 606 and receiving another packet as in 602.

However, when the header indicates no more packets are coming (e.g. more bit=0), the method 600 can include determining whether all packets have been received as in 608. For example, in some embodiments, the method 600 can determine that all packets have been received by determining whether each sequence number from 1 to N has been received, where N is the sequence number stored in a last packet (e.g. the packet having more bit=0). When all packets have been received, the method 600 can include defragmenting the message by ordering the payload of each of the packets using the sequence number in each of the packets as in 610. However, when all packets have not been received, the method 600 can include indicating a read failure as in 612.

Figure 7:
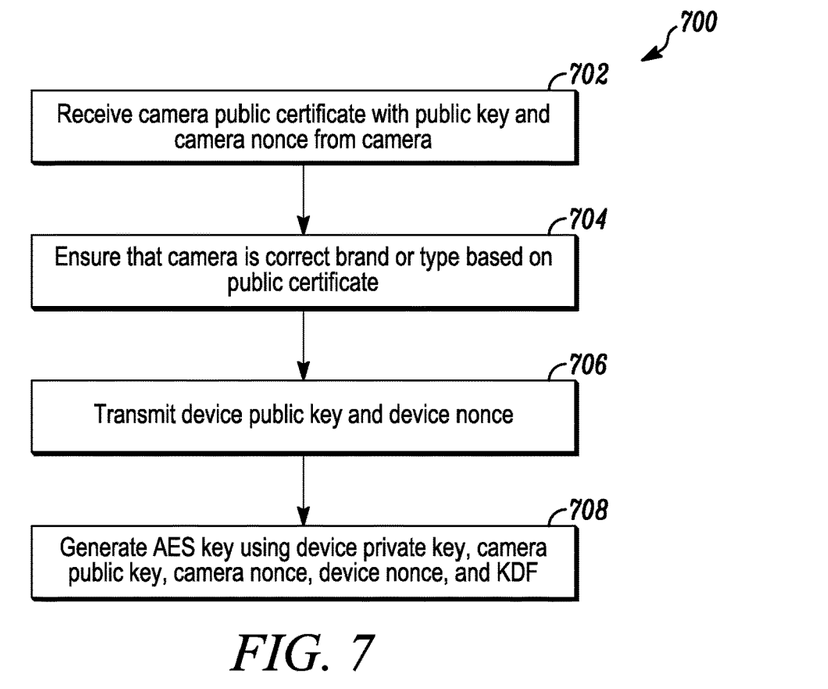
FIG. 7 is a flow diagram of a process of a phone and a camera exchanging ECDH keys via a BLE signal in accordance with disclosed embodiments.

FIG. 7 is a flow diagram of a method 700 for generating an encryption key in accordance with disclosed embodiments. As seen in FIG. 7, the method 700 can include a user device (e.g. user device 38) receiving a camera public certificate, which can include a camera public key, and a camera nonce from a camera (e.g. the security camera 22) as in 702, and the user device ensuring that the camera is an expected brand or type based on the camera public certificate as in 704. For example, the user device can ensure that the camera is the expected brand or type to assure compatibility with a mobile application running on the user device by confirming that the camera public certificate set by a manufacturer of the camera has a particular format that indicates the expected brand or type of the camera. Furthermore, the method 700 can include the user device transmitting a device public key and a device nonce to the camera as in 706, and the user device generating an AES encryption key using the camera public key, a phone private key, the camera nonce, the phone nonce, and a key derivation function (KDF) as in 708. Similarly, the camera can generate the AES encryption key using the camera private key, the phone public key, the camera nonce, the phone nonce, and the key derivation function (KDF). Therefore, in some embodiments, the AES encryption key can be used to encrypt and decrypt all communications between the user device and the camera, such as communications that include the camera PIN and the device PIN described above or any communications via Bluetooth. In some embodiments, the camera nonce and the device nonce can include randomly generated numbers.

Figure 8:
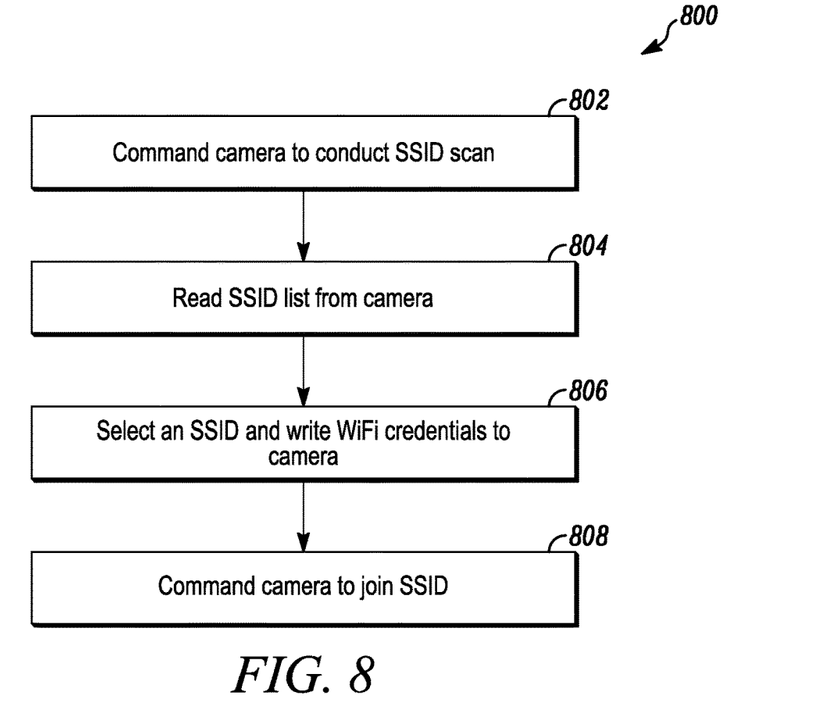
FIG. 8 is a flow diagram of a process of a camera connecting to a Wi-Fi network in accordance with disclosed embodiments.

FIG. 8 is a flow diagram of a method 800 of a camera joining a wireless network in accordance with disclosed embodiments. As seen in FIG. 8, the method 800 can include a user device (e.g. user device 38) instructing the camera (e.g. the security camera 22) to conduct an SSID scan as in 802, the user device reading an SSID list from the camera after the camera conducts the SSID scan as in 804, and the user device selecting an SSID from the SSID list and providing WiFi credentials for the SSID as in 806. In some embodiments, the user device can automatically select the SSID and automatically provide the WiFi credentials to the camera, or a user can select the SSID and enter the WiFi credentials via a mobile application. Furthermore, in some embodiments, the method 800 can include the user device instructing the camera to join the wireless network associated with the SSID, and in some embodiments, the camera can confirm joining the wireless network and test the wireless network by attempting to navigate to a URL associated with a provisioning server (e.g. the provisioning server 44).

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   a user device establishing a Bluetooth connection with a camera;
   the user device receiving a camera PIN from the camera via the Bluetooth connection;
   the user device generating and displaying a QR code including the camera PIN and a device PIN;
   the user device receiving a message from the camera via the Bluetooth connection; and
   the user device confirming that the message includes the device PIN.

2. The method of claim 1, further comprising:
   the user device transmitting wireless network credentials for a wireless network to the camera; and
   the user device instructing the camera to join the wireless network using the wireless network credentials.

3. The method of claim 1, further comprising providing a URL for a provisioning server to the camera.

4. The method of claim 1 wherein the camera is part of a security system protecting a secured area.

5. The method of claim 1 further comprising:
   the user device receiving a camera public certificate, a camera public key, and a camera nonce from the camera;
   the user device transmitting a device public key and a device nonce to the camera; and
   the user device generating an encryption key using the camera public key, a device private key, the camera nonce, the device nonce, and a key derivation function.

6. The method of claim 5 further comprising the user device executing an Elliptic-curve Diffie-Hellman (ECDH) operation via the Bluetooth connection to generate the encryption key, wherein the device PIN and the camera PIN are encrypted in the QR code using the encryption key.

7. The method of claim 5 further comprising the user device decrypting the camera PIN using the encryption key after receiving the camera PIN via the Bluetooth connection.

8. The method of claim 1 wherein the device PIN is randomly generated.

9. A method comprising:
   a camera establishing a Bluetooth connection with a user device;
   the camera transmitting a camera PIN to the user device via the Bluetooth connection;
   the camera capturing an image of a QR code displayed on a screen of the user device, wherein the QR code includes the camera PIN and a device PIN;
   the camera confirming that the QR code includes the camera PIN; and
   the camera transmitting a message including the device PIN to the user device via the Bluetooth connection.

10. The method of claim 9, further comprising:
    the camera receiving wireless network credentials for a wireless network from the user device; and
    the camera joining the wireless network using the wireless network credentials.

11. The method of claim 9, further comprising the camera receiving a URL for a provisioning server from the user device.

12. The method of claim 9 wherein the camera is part of a security system protecting a secured area.

13. The method of claim 9 further comprising:
    the camera transmitting a camera public certificate, a camera public key, and a camera nonce to the user device;
    the camera receiving a device public key and a device nonce from the user device; and
    the camera generating an encryption key using a camera private key, the device public key, the camera nonce, the device nonce, and a key derivation function.

14. The method of claim 13 further comprising the camera executing an Elliptic-curve Diffie-Hellman (ECDH) operation via the Bluetooth connection to generate the encryption key.

15. The method of claim 13 further comprising the camera decrypting the device PIN and the camera PIN from the QR code using the encryption key.

16. The method of claim 9 wherein the camera PIN is randomly generated.

17. A system comprising:
    a user device; and
    a camera connected to the user device via a Bluetooth connection;
    wherein the camera generates and transmits a camera PIN to the user device via the Bluetooth connection,
    wherein the user device generates a device PIN,
    wherein the user device generates a QR code including the camera PIN received from the camera and the device PIN generated by the user device and displays the QR code on a screen of the user device,
    wherein the camera captures an image of the QR code and decodes the QR code,
    wherein the camera determines whether the QR code includes the camera PIN transmitted to the user device,
    wherein the camera decodes the device PIN in the QR code and transmits the device PIN decoded from the QR code to the user device via the Bluetooth connection, and
    wherein the user device determines whether the device PIN received from the camera via the Bluetooth connection matches the device PIN generated by the user device.

18. The system of claim 17, further comprising a wireless network access point, wherein the user device is connected to the wireless network access point and stores wireless network credentials of the wireless network access point.

19. The system of claim 18, wherein the user device transmits the wireless network credentials to the camera via the Bluetooth connection.

20. The system of claim 18, wherein the camera PIN and the device PIN included in the QR code are encrypted.

\* \* \* \* \*